Nov. 15 1966 J. LEOSTIC 3,286,157

DEVICE FOR THE STABILIZATION OF D.C. VOLTAGE

Filed April 16, 1962

INVENTOR
JOSEPH LEOSTIC
BY Paul M. Craig, Jr.
ATTORNEY

United States Patent Office 3,286,157
Patented Nov. 15, 1966

3,286,157
DEVICE FOR THE STABILIZATION OF D.C. VOLTAGE

Joseph Leostic, Sevres, France, assignor to Cit—Compagnie Industrielle des Telecommunications, Paris, France Filed Apr. 16, 1962, Ser. No. 187,619
Claims priority, application France, Apr. 20, 1961, 859,340
6 Claims. (Cl. 323—18)

Figures 1, 2:
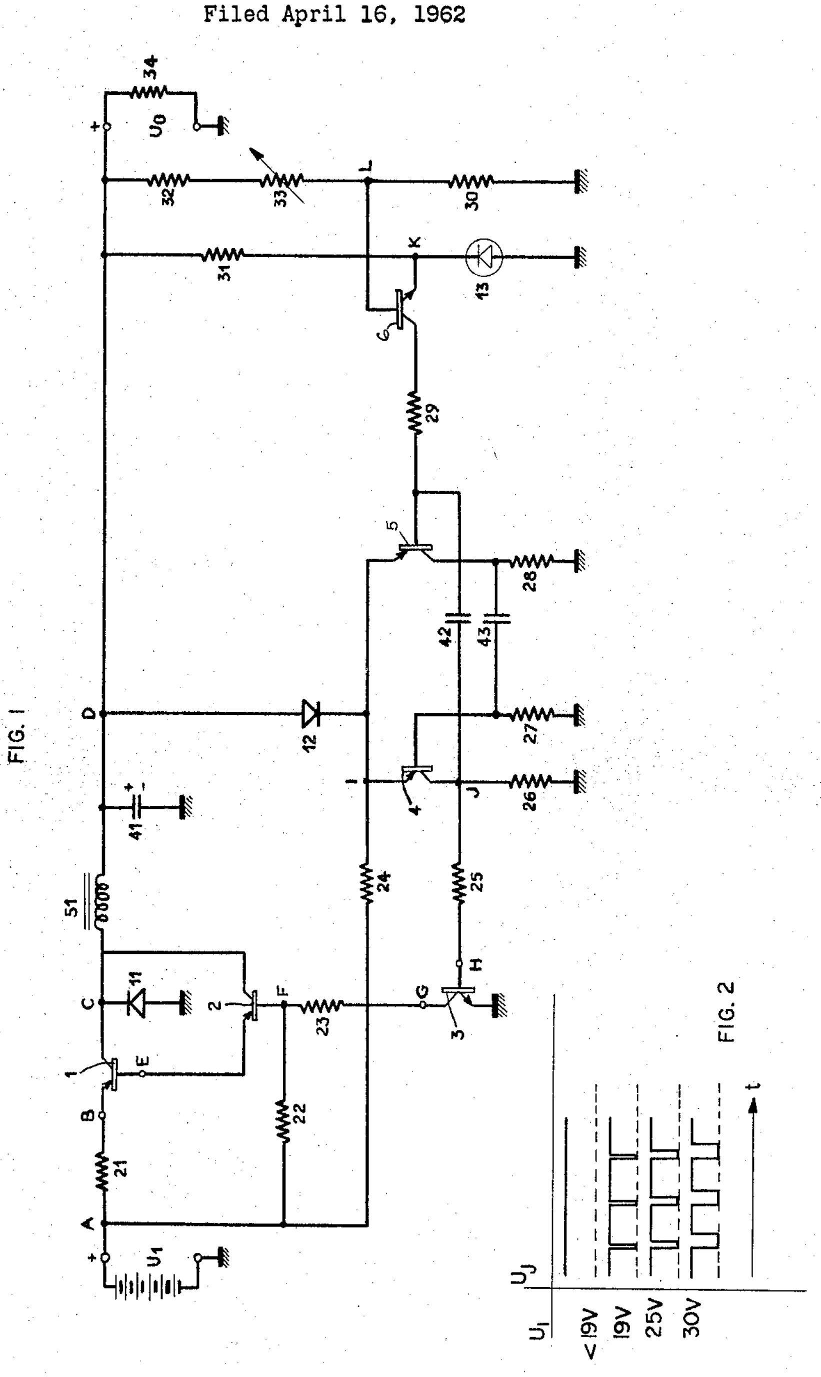

The present invention relates to a device for the stabilization of D.C. voltage, ensuring with a high output, the supply of a charge at constant voltage, stabilized with respect to variations of the source of current and of the load. This device is applicable when the voltage of the source does not exceed about thirty volts.

Stabilization devices are known, in which the current supplied passes through a variable impedance arranged in series in the utilization circuit; this impedance consists of a tube or transistor of which the internal resistance is automatically adjusted by the variation of the bias of the input circuit, so that the voltage applied to the load impedance has the desired value. Devices of this kind give good results, but a large proportion of the power supplied by the source is dissipated in the variable impedance arranged in series, so that their output is low when the difference between the voltage of the source and the stabilized voltage is great.

Also well known are gas rectifier tubes with an automatically controlled firing angle, capable of supplying, with good output, a certain power at a stabilized D.C. voltage.

The voltage stabilized device according to the invention is characterised in this, that it comprises in series between said source and the utilization impedance, a switching transistor which is rendered alternately conductive and non-conductive, its utilization factor (ratio of the "on"-time to the "off"-time during its period of operation) being automatically adjusted to such a value that the voltage on the terminal of the utilization impedance has the desired constant value. The switching from conductive to non-conductive is obtained by controlling the switching transistor by the square-wave output voltage of a transistorised multivibrator, the utilization factor being automatically adjusted as a function of an error signal obtained by the comparison of the effective output voltage with a reference voltage.

This multivibrator comprises two resistors one of which is fixed, and the other is composed of a transistor of which the internal resistance varies under the action of the error signal applied to its input circuit. The variation of internal resistance of this transistor causes a variation of the ratio of the times of the two steps of the output wave of the multivibrator (and incidentally also a variation of the frequency of said output wave).

Since the drop of voltage in the switching transistor is very low during the conductive stage, and the current practically zero during the non-conductive stage and furthermore since the losses in the other elements of the circuit are very low, the stabilization device so constituted has a high output, comprised between 80 and 90% of the input power according to the conditions of utilization.

A description will now be given, by way of example of the structure and operation of a voltage stabilization device in accordance with the invention, with reference to the attached drawings. FIG. 1 is the circuit diagram of the device and FIG. 2 a diagram giving the different wave forms at the point J of the diagram of FIG. 1 in various conditions of operation of the device. In this last figure, different time scales have been utilized for each of the curves so that the effect of frequency change with change of impedance is eliminated from the figure; thus, the rectangular waves corresponding to the different voltages are arranged directly under each other so as to facilitate a comparison of the forms thereof. In spite of this illustration, it should be understood that there is a frequency variation at point J due to the variation of the internal resistance of the transistor 6.

In the example under consideration the voltage to be stabilized is positive with respect to earth, so that the switching transistor 1 must be of the p-n-p type. If the current required is relatively intense, it will be possible to connect several transistors of this type in parallel. Devices 2, 4 and 5 are p-n-p transistors, 3 an n-p-n transistor. The elements 21 to 32 are fixed resistors. 33 is a variable resistor, 34 the utilization impedance. 41 is an electro-chemical capacitor. Elements 42 and 43 are capacitors. Element 51 is a "smoothing" inductance. Elements 11 and 12 are crystal diodes. Element 13 is a Zener diode which stabilizes the voltage $U_K$ at the point K, for example at +5 volts.

The switching transistor 1 opens or closes the circuit of the current delivered by the positive voltage source $U_I$ in the utilization impedance 34, at stabilized voltage $U_O$. Transistors 4 and 5 form the multivibrator, of which the output voltage, in the form of an asymmetrical square wave, is applied by the resistor 25 to the base-electrode of the transistor 3. The transistors 3 and 2 act as amplifiers, applying the output voltage of the multivibrator, picked up at J on the collector of the transistor 4, to the base-electrode of the switching transistor 1.

In the multivibrator (4, 5) the transistor 6 acts as variable resistor connected in the base circuit of transistor 5, causing the ratio of time of rise to time of fall of the voltage picked up on the collector of transistor 4 to vary with the internal resistance of transistor 6. The internal resistance of the transistor 6 varies as a function of the difference of potential between its base electrode (point L) and its emitter electrode (point K). If the voltage of point L is less positive than that of point K, the transistor 6 is blocked, its internal impedance being practically infinite, and the same applies to the transistor 5 of which the base-electrode circuit is cut-off; the result is that the multi-vibrator does not oscillate and the transistor 4 is permanently conductive. When the potential of point L reaches the reference potential of the point K for example, 5 volts, the internal impedance of the transistor 6 assumes a finite value, but still very high with respect to the resistor 27. The multivibrator begins to relax, with a rise time much longer than the time of fall. As the difference of potential $U_L$–$U_K$ increases, the internal impedance of the transistor 6 decreases. For the limit value used in practice, this impedance remains higher than 22,000 ohms, the value of the resistor 27, i.e. the output voltage of the multivibrator remains asymmetrical, its time of rise being slightly longer than its time of fall.

The voltage of the collector electrode of transistor 4 is transmitted to the base-electrode of transistor 1 via transistors 2 and 3. As long as the multivibrator does not begin to oscillate, there is no stabilization effect: the output voltage $U_O$ increases approximately linearly with $U_1$. When $U_L$ reaches the value $U_K$, the multivibrator begins to relax, and the switching transistor operates: the voltage $U_O$ therefore increases less rapidly than the voltage $U_1$. The more the voltage $U_1$ rises, the greater is the tendency of the voltage $U_O$ to rise. The result is that, since the difference $U_L$–$U_K$ increases when $U_1$ increases, the ratio "conductive/non-conductive" decreases, the voltage $U_O$ increases much less rapidly than $U_1$ and, due to the gain in the slave loop, a very satisfactory stabilization is obtained as soon as $U_1$ exceeds $U_O$ by about 2 volts.

The inductance 51 and the electrochemical capacitor 41 form a filter-network which delivers at D a filtered D.C. voltage equal to the mean value of the voltage cut off at the point C. During the non-conductive square waves, the inductance 51 is no longer connected to the source. The energy which it has stored during the time of the square wave at the highest potential serves, during the time of the square wave at the lowest potential, to maintain the charge of the capacitor 41 and to ensure the output in the utilization impedance. During this time, the connection with the source $U_1$ being cut, the circuit is reclosed by the rectifier 11. The flow of the current into this rectifier causes a drop of voltage, so that during the low square wave (non-conductive) the voltage of the point C is slightly negative.

Let us assume the value of stabilized voltage desired is 20 volts, for example. As long as $U_1$ is less than this value, the stabilization device does not function, the multivibrator does not oscillate, the transistors 1, 2, 3 are permanently conductive.

When the voltage $U_1$ of the source exceeds the reference value by a certain amount (of the order of some tenths of a volt), the multivibrator begins to relax, the stabilization device acts and the output voltage $U_O$ is fixed, with a high degree of approximation, at the reference value.

The following table gives, as an indication, the value in volts, of the voltages at the various points A to L of the circuit in three characteristic cases: (a) before the multivibrator begins to oscillate, the voltage $U_1$ being lower than the predetermined stabilized voltage 20 volts; (b) state of relaxation of the multivibrator and effective operation of the stabilizing device, switching transistor conductive; (c) as in (b) but switching transistor blocked:

| | A | B | C | D | E | F | G | H | I | J | K | L |
|---|---|---|---|---|---|---|---|---|---|---|---|---|
| (a) | 19 | 18.5 | 18.2 | 18 | 18.3 | 18.2 | 0.3 | 0.1 | 17.5 | 17 | 5 | 4.9 |
| (b) | 21 | 20.5 | 20.2 | 20 | 20.3 | 20.2 | 0.3 | 0.1 | 19.5 | 19 | 5 | 5.2 |
| (c) | 21 | 21 | −0.5 | 20 | 21 | 21 | 21 | 0 | 19.5 | 0 | 5 | 5.2 |

It would have been possible to apply the collector electrode of the transistor 2 to earth, but it is better to apply it to point C, i.e. to the ouput of transistor 1: the transistor 2 is then fed at low voltage, which reduces the current which it absorbs, and increases the output of the device.

It would also have been possible to feed the multivibrator by the gross voltage $U_1$ of the source, but it is better to feed it by the stabilized voltage, because in this way the effect of the variations of the voltage on its frequency is eliminated. Since, when starting there is no stabilized voltage, since for the transistor 1 to be conductive it is necessary for the transistor 4 also to be conductive, the shunt by the resistor 24 ensures the feeding of the multivibrator until the charging of the electrochemical capacitor 41. As soon as the stabilized voltage appears at D, the feed voltage of the multivibrator passing through the rectifier 12 causes a very slight voltage drop, and the current passing through the resistor 24 decreases considerably.

The resistors 21 and 22 are not essential, but are nevertheless very useful, because they fix very strictly the blocking conditions of the transistor 1. Actually, since the transistor 3 is certainly blocked, the voltage at point F is $U_1$, that is, 21 volts in the example under consideration. If there are 21 volts on the base electrode of the transistor 2, since the emitter electrode thereof can no longer be positive, this transistor is also blocked: the voltage on its emitter electrode is 21 volts, and this voltage is therefore also applied to the base electrode of the transistor 1. Under these conditions, the least current flowing in the transistor 1 would render the emitter electrode more negative than the base electrode, the transistor 1 is therefore certainly blocked.

When the internal resistance of the transistor 6 varies, it is not merely the utilization factor which varies, but also the frequency of the multivibrator; however, this incidental effect in no way reduces the efficiency of the stabilization device.

The whole of the power dissipated in the transistors and in the various resistors and the "smoothing" inductance, is very low with respect to the power which could be supplied to the load impedance; for a stabilized voltage of 19 volts the output reaches 95% when the gross voltage is 21 volts, and it is still 85% when said voltage is 30 volts.

The stabilization is equally good with respect to variations of load: for example for a fixed voltage $U_1$, the stabilized voltage $U_O$ varies between 19.4 volts and 19.2 volts for an output varying from 1 to 10 amperes.

The value of the stabilized voltage is regulated by adjusting the variable resistor 33; since the potential of the point L is always in the vicinity of 5 volts for a given Zener diode, the voltage on the point D varies in accordance with the resistance of the branch (32+33).

When the voltage $U_1$ varies from 22 to 30 volts, the voltage $U_O$ remains fixed at 19.4 volts within 0.05. For $U_1=21$ volts, we still have $U_O=19.1$ volts.

What is claimed is:

1. A device for stabilizing the voltage supplied by a direct current voltage source to a utilization means including a switching transistor connected in series between said voltage source and said utilization means for selectively connecting said voltage source to said utilization means in response to a control signal and storage capacitor means connected in parallel with said utilization means so as to be charged by said voltage source, the improvement comprising means for stabilizing the voltage on said storage capacitor means at a predetermined voltage level including voltage divider means for detecting the voltage difference between a reference voltage and a fraction of said stabilized voltage, multivibrator means for generating said control signal, voltage controlled variable impedance means controlled by said voltage difference for biasing said multivibrator means to a stable state providing a continuous output control signal when said voltage source is below said predetermined voltage level and for biasing said multivibrator means to provide a square-wave output control signal when said voltage source is above said predetermined voltage level, said multivibrator means being provided with energizing voltage on the one hand from said voltage source via impedance means and on the other hand from said storage capacitor via rectifier means, an amplifier means connecting the output of said multivibrator means to said switching transistor in control thereof.

2. A device for stabilizing the voltage supplied by a direct current voltage source to a utilization means including a switching transistor connected in series between said voltage source and said utilization means for selectively connecting said voltage source to said utilization means in response to a control signal and storage capacitor means connected in parallel with said utilization means so as to be charged by said voltage source, the improvement comprising means for stabilizing the voltage on said storage capacitor means at a predetermined voltage level including voltage divider means for detecting the voltage difference between a reference voltage and a fraction of said stabilized voltage, multivibrator means for generating said control signal, voltage controlled variable impedance means controlled by said voltage difference for biasing said multivibrator means to a stable state providing a continuous output control signal when said voltage source is below said predetermined voltage level and for biasing said multivibrator means to provide a square-wave output control signal when said voltage source is above said predetermined voltage level, said multivibrator means being provided with energizing voltage on the one hand from said voltage source via impedance means and on the other hand from said storage capacitor via rectifier means, an amplifier means connecting the output of said multivibrator means to said switching transistor in control thereof, the impedance of said impedance means connected to said multivibrator being much greater than the impedance of said rectifier means such that said multivibrator means is energized essentially entirely by the stabilized voltage of said storage capacitor.

3. A device for stabilizing the voltage supplied by a direct current voltage source to a utilization means including a switching transistor connected in series between said voltage source and said utilization means for selectively connecting said voltage source to said utilization means in response to a control signal and storage capacitor means connected in parallel with said utilization means so as to be charged by said voltage source, the improvement comprising means for stabilizing the voltage on said storage capacitor means at a predetermined voltage level including voltage divider means for detecting the voltage difference between a reference voltage and a fraction of said stabilized voltage, multivibrator means for generating said control signal, voltage controlled variable impedance means controlled by said voltage difference for biasing said multivibrator means to a stable state providing a continuous output control signal when said voltage source is below said predetermined voltage level and for biasing said multivibrator means to provide a square-wave output control signal when said voltage source is above said predetermined voltage level, said multivibrator means being provided with energizing voltage on the one hand from said voltage source via impedance means and on the other hand from said storage capacitor via rectifier means, and amplifier means connecting the output of said multivibrator means to said switching transistor in control thereof, the impedance of said impedance means connected to said multivibrator being much greater than the impedance of said rectifier means such that said multivibrator means is energized essentially entirely by the stabilized voltage of said storage capacitor, the rise and fall times of said square wave being of unequal duration, the ratio of which is inversely proportional to the magnitude of said voltage difference detected by said voltage divider means.

4. A device for stabilizing the voltage supplied by a direct current voltage source to a utilization means including a switching transistor connected in series between said voltage source and said utilization means for selectively connecting said voltage source to said utilization means in response to a control signal and storage capacitor means connected in parallel with said utilization means so as to be charged by said voltage source, the improvement comprising means for stabilizing the voltage on said storage capacitor means at a predetermined voltage level including voltage divider means for detecting the voltage difference between a reference voltage and a fraction of said stabilized voltage, multivibrator means for generating said control signal voltage controlled variable impedance means controlled by said voltage difference for biasing said multivibrator means to a stable state providing a continuous output control signal when said voltage source is below said predetermined voltage level and for biasing said multivibrator means to provide a square-wave output control signal when said voltage source is above said predetermined voltage level, said multivibrator means being provided with energizing voltage on the one hand from said voltage source via impedance means and on the other hand from said storage capacitor via rectifier means, and amplifier means connecting the output of said multivibrator means to said switching transistor in control thereof, the impedance of said impedance means connected to said multivibrator being much greater than the impedance of said rectifier means such that said multivibrator means is energized essentially entirely by the stabilized voltage of said storage capacitor, the rise and fall times of said square wave being of unequal duration, the ratio of which is inversely proportional to the magnitude of said voltage difference detected by said voltage divider means, said multivibrator means including an asymmetrical multivibrator and said voltage controlled variable impedance means for biasing said multivibrator means consisting of a transistor connected in the biasing circuit of said multivibrator and capable of controlling the bias thereof in relation to its internal impedance, which is controlled by the magnitude of said voltage difference.

5. A device for stabilizing the voltage supplied by a direct current voltage source to a utilization means including a switching transistor connected in series between said voltage source and said utilization means for selectively connecting said voltage source to said utilization means in response to a control signal and storage capacitor means connected in parallel with said utilization means so as to be charged by said voltage source, the improvement comprising means for stabilizing the voltage on said storage capacitor means at a predetermined voltage level including voltage divider means for detecting the voltage difference between a reference voltage and a fraction of said stabilized voltage, multivibrator means for generating said control signal, voltage controlled variable impedance means controlled by said voltage difference for biasing said multivibrator means to a stable state providing a continuous output control signal when said voltage source is below said predetermined voltage level and for biasing said multivibrator means to provide a square-wave output control signal when said voltage source is above said predetermined voltage level, said multivibrator means being provided with energizing voltage on the one hand from said voltage source via impedance means and on the other hand from said storage capacitor via rectifier means, and amplifier means connecting the output of said multivibrator means to said switching transistor in control thereof, the rise and fall times of said square wave being of unequal duration, the ratio of which is inversely proportional to the magnitude of said voltage difference detected by said voltage divider means.

6. A device for stabilizing the voltage supplied by a direct current voltage source to a utilization means including a switching transistor connected in series between said voltage source and said utilization means for selectively connecting said voltage source to said utilization means in response to a control signal and storage capacitor means connected in parallel with said utilization means so as to be charged by said voltage source, the improvement comprising means for stabilizing the voltage on said storage capacitor means at a predetermined voltage level including voltage divider means for detecting the voltage difference between a reference voltage and a fraction of said stabilized voltage, multivibrator means for generating said control signal, voltage controlled variable impedance means controlled by said voltage difference for biasing said multivibrator means to a stable state providing a continuous output control signal when said voltage source is below said predetermined voltage level and for biasing said multivibrator means to provide a square-wave output control signal when said voltage source is above said predetermined voltage level, said multivibrator means being provided with energizing voltage on the one hand from said voltage source via impedance means and on the other hand from said storage capacitor via rectifier means, and amplifier means connecting the output of said multivibrator means to said switching transistor in control thereof, the rise and fall times of said square wave being of unequal duration, the ratio of which is inversely proportional to the magnitude of said voltage difference detected by said voltage divider means, said multivibrator means including an asymmetrical multivibrator and said voltage controlled variable impedance means for biasing said multivibrator means consisting of a transistor connected in the biasing circuit of said multivibrator and capable of controlling the bias thereof in relation to its internal impedance, which is controlled by the magnitude of said voltage difference.

References Cited by the Examiner

UNITED STATES PATENTS

| | | | |
|---|---|---|---|
| 2,965,832 | 12/1960 | Lode | 323—18 |
| 2,969,498 | 1/1961 | Stenudd | 323—22 |
| 3,173,078 | 3/1965 | Farnsworth | 323—9 |

JOHN F. COUCH, *Primary Examiner.*

LLOYD McCOLLUM, *Examiner.*

K. W. HADLAND, K. D. MOORE, *Assistant Examiners.*